United States Patent
Baldur et al.

Patent Number: 6,154,562
Date of Patent: Nov. 28, 2000

[54] PORTABLE FIRED CARTRIDGE IMAGING APPARATUS

[75] Inventors: Roman Baldur, Waterloo; Yvan Boudreau, Melocheville, both of Canada

[73] Assignee: Forensic Technology Wai Inc., Montreal, Canada

[21] Appl. No.: 09/090,788

[22] Filed: Jun. 4, 1998

Related U.S. Application Data

[63] Continuation of application No. PCT/CA96/00466, Jul. 11, 1996.

[30] Foreign Application Priority Data

Dec. 4, 1995 [CA] Canada .................................. 2164369

[51] Int. Cl.[7] ...................................................... G06K 9/00
[52] U.S. Cl. ........................................... 382/141; 382/108
[58] Field of Search .................................... 382/141, 108; 206/316.2; 359/507, 510–513, 383, 385, 382; D15/131; 364/409, 423; 356/72, 237, 375, 153, 394, 398, 372, 138, 141, 150, 152, 4, 5, 73; 250/561

[56] References Cited

U.S. PATENT DOCUMENTS

| | | | |
|---|---|---|---|
| 3,900,252 | 8/1975 | Di Salvo et al. | 353/39 |
| 4,595,265 | 6/1986 | Hodgson . | |
| 5,038,035 | 8/1991 | Nishimura et al. | 250/311 |
| 5,379,106 | 1/1995 | Baldur | 356/375 |
| 5,390,108 | 2/1995 | Baldur et al. | 364/409 |

FOREIGN PATENT DOCUMENTS

WO-A-92 20988 11/1992 WIPO .

Primary Examiner—Jose L. Couso
Assistant Examiner—Shawn B. Cage
Attorney, Agent, or Firm—Cantor Colburn LLP

[57] ABSTRACT

The portable spent cartridge casing examination imaging apparatus has a carrying case in which all the necessary components for field imaging of spent cartridge casings are contained securely for transport when the case is closed, and can be solidly assembled in the field for imaging. The case includes a base, a lid which locks in a vertical open position. A spent cartridge casing mounting device is provided for holding the cartridge substantially aligned with a longitudinal axis with the primer surface of the cartridge being substantially perpendicular to the axis, and an imaging system consisting of a cartridge microscope, camera, and light source are solidly interconnected with the mounting device to form a unit which is connected to the lid such that when the lid is open, the unit is substantially vertically disposed, while being at least partially received by the base of the case when the lid is closed for safe storage. The microscope has an adjustable magnification and focus adjustment mechanism for adjusting a magnification of the microscope and a focus of the microscope between two settings to image a breech face impression on the primer surface and a firing pin impression surface in the primer surface so that full images of the breech face and the firing pin impressions can be obtained with good focus using a single adjustment. The apparatus is designed for field use by a police officer having limited training in spent cartridge casing examination imaging, and the images obtained are to be sent to a forensic spent cartridge casing examination center where forensic experts can carry out proper examination of the spent cartridge casing images.

17 Claims, 7 Drawing Sheets

PORTABLE FIRED CARTRIDGE IMAGING APPARATUS

This application is a continuation of PCT/CA96/00466 filed Jul. 11, 1996, which designates the United States.

FIELD OF THE INVENTION

The present invention relates to a spent cartridge casing examination imaging method and apparatus for use during forensic analysis of spent firearm cartridges.

BACKGROUND OF THE INVENTION

Fired bullets and bullet cartridges are left with markings from the firearm from which they come. These markings result from forced contact with metal parts in the firearm and are unique to the firearm since the metal parts have engraved surfaces which are themselves unique due to the machining process during manufacturing. Using microscopic examination of fired bullets and cartridges (casings or shells), firearms experts have traditionally been able to compare markings to identify whether fired bullets or spent cartridges originate from a given firearm.

The process of bullet examination has been successfully automated using apparatus as set out in PCT/CA92/00216 (published as WO 92/20988). Bullet illumination is described in U.S. Pat. No. 5,379,355.

In manual comparison of spent cartridge casings, the cartridge casing under investigation is placed under a microscope along with a test cartridge casing from a known firearm. The markings on or in the impressions made on a cartridge casing during firing and ejection are analyzed under a microscope and compared with markings from another cartridge casing to determine if there is a match between the two cartridge casings. In the case of a cartridge casing having a primer surface, the impression of the breech face on the primer surface and the firing pin impression in the primer surface have markings that are compared. Conventionally, side illumination is used which provides an image dependent on the direction of the illumination. To compare the markings on cartridge bases, the angle of illumination must be the same. For this purpose, illumination direction protocols are used. When two cartridge casings originate from the same firearm, the markings will have the same characteristics. Since the appearance of the primer breech face impression and firing pin impression is different using different angles of illumination, the firearms examiner will usually confirm a match using illumination from more than one angle.

Images are typically taken by ballistics experts in a forensic laboratory. Computer analysis of the images to determine whether the spent cartridge casings can be traced to a known weapon is also done in the laboratory, possibly at a much later time than the image acquisition. The time elapsed from the moment when a cartridge casing is found at a crime scene to when the cartridge casing is taken to the lab may be a few hours to a few days, the greater time lapse arising when the nearest forensic lab is not located in the same city or even in a nearby city. There is also the possibility that a spent cartridge casing could be lost or misidentified as a result of shipping and transferring.

SUMMARY OF THE INVENTION

It is an object of the present invention to provide a portable spent cartridge casing imaging apparatus for use by police officers in the field.

It is another object of the invention to provide a portable spent cartridge casing imaging apparatus contained in a case in which the imaging optics, camera and cartridge holder are safely secured in the case for transport and are arranged to be rigidly mounted together and to the case for imaging in the field.

It is further object of the invention to provide a portable spent cartridge casing imaging apparatus contained in a carrying case in which the imaging optics, camera and cartridge holder are rigidly connected together and mounted to a lid of the case to be held upright and accessible when the lid is open.

It is yet another object of the invention to provide a method of spent cartridge casing analysis in which imaging of the spent cartridge casing is carried out in the field using a mobile imaging apparatus to obtain a spent cartridge casing image, and the obtained image is sent to a forensic spent cartridge casing image comparison laboratory for automated comparison of the obtained image with other images to determine one or more "best" or closest matches between the obtained image and the other images.

It is a further object of the present invention to provide such an apparatus which can switch between a magnification suitable to view the firing pin impression and a magnification suitable to view the breech face impression on the primer surface, in which a focus of the imaging optics is automatically changed as the magnification is changed to keep both the firing pin impression and primer surface images in good focus without requiring separate adjustments by the police officer in the field.

It is yet another object of the present invention to provide a portable spent cartridge casing imaging apparatus which takes images in the field and has a wireless data transmission means for sending image data recorded to a forensic laboratory where the image data can be analyzed by forensic experts or technicians.

According to a first aspect of the invention, there is provided a portable spent cartridge casing examination imaging apparatus comprising a spent cartridge casing mounting device for holding the cartridge substantially aligned with a longitudinal axis, a cartridge microscope having an optical axis, a light source for projecting light onto the cartridge head, a camera for obtaining an image through said microscope, a carrying case, means for securing said mounting device, said microscope, said light source and said camera inside said case for transport, and means for solidly assembling said mounting device, said microscope, said light source and said camera together with said longitudinal axis parallel to said optical axis. Preferably, the cartridge mounting device is solid with means for receiving the microscope and includes focus adjustment means. The camera may comprise a digital camera connected to an image acquisition computer contained within the case.

According to the invention, there is provided a spent cartridge casing examination imaging apparatus comprising: a spent cartridge casing mounting device for holding the cartridge substantially aligned with a longitudinal axis, a primer surface of the cartridge being substantially perpendicular to the axis; a cartridge microscope having an adjustable magnification and an optical axis and mounted with the optical axis substantially parallel to the longitudinal axis; a light source mounted to project light onto the breech face impression and the firing pin impression surface; and simultaneous magnification and focus adjustment means for adjusting a magnification of the microscope and a focus of the microscope between two settings to image a breech face impression on the primer surface and a firing pin impression surface in the primer surface, whereby fill images of the breech face and the firing pin impressions can be obtained with good focus using a single adjustment.

There is further provided a portable spent cartridge casing examination imaging apparatus comprising: a carrying case having a base, a lid and means for holding the lid open; a spent cartridge casing mounting device for holding the cartridge substantially aligned with a longitudinal axis, a head of the cartridge being substantially perpendicular to the axis; a cartridge microscope having an adjustable magnification and an optical axis and mounted with the optical axis substantially parallel to the longitudinal axis; a camera for recording an image from the microscope; a light source mounted to project light onto the cartridge head; holding means for solidly interconnecting the mounting device, the microscope, the camera and light source; and means for connecting the holding means to the lid such that the mounting device, the microscope, the camera and the light source are substantially vertically disposed when the lid is open, the mounting device, the microscope, the camera and the light source being at least partially received by the base of the case when the lid is closed, whereby the apparatus can be used in a conventional manner when the lid is open and can be safely transported when the lid is closed.

BRIEF DESCRIPTION OF THE DRAWINGS

The invention will be better understood by way of the following detailed description of a preferred embodiment and a second embodiment with reference to the appended drawings, in which.

DETAILED DESCRIPTION OF THE PREFERRED EMBODIMENT

Figure 1:
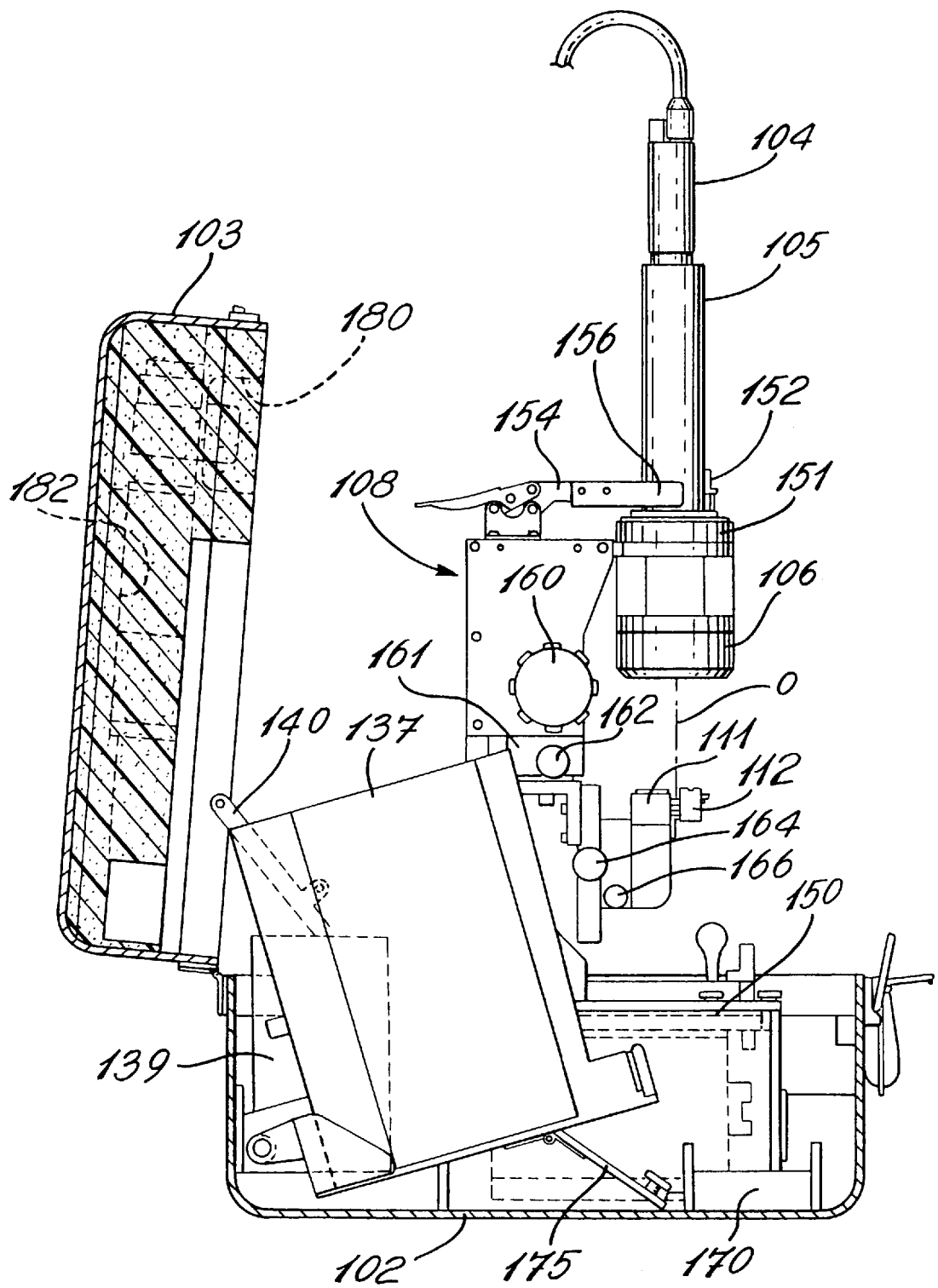
FIG. 1 is a partly sectional view of a side elevation of the apparatus according to the preferred embodiment arranged for operation.

As shown in FIG. 1, the apparatus according to the preferred embodiment comprises a carrying case having a bottom half 102 and a top lid 103. A charge coupled device (CCD) digital camera 104 is mounted to a microscope 105 which is received by a circular receiving mounting 151 which is solidly connected to a mounting bracket 108. At the bottom of the microscope receiving mounting 151, there is mounted a ring light projector 106 (e.g. a Nikon fiber optic ring light model 55525111) which projects light axisymmetrically about an optical axis o. The bracket 108 has a mobile carriage 161 which is moved in the sideways direction (left to right in FIG. 2) using knob 160. Movement in a direction transverse to the optical axis o and in a forward reverse direction is made possible by the adjustment control knob 162. A coarse focus adjustment is made possible by the adjustment control knob 164 and a fine focus adjustment is made possible by adjustment control knob 166. The cartridge casing is placed such that its head is held in place between the mobile block 112 and the fixed block 111.

Figure 2:
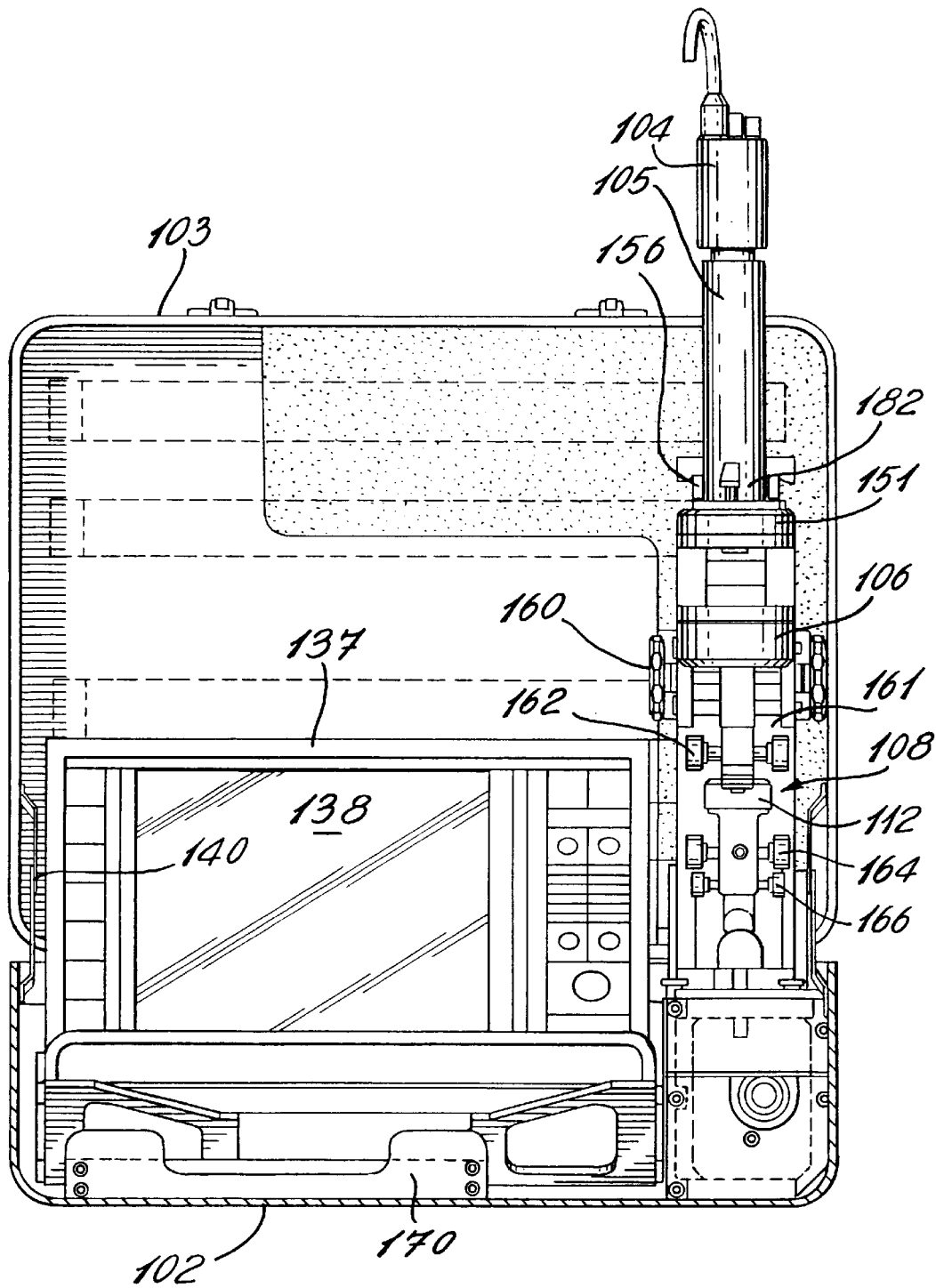
FIG. 2 is a partly sectional view of a front elevation of the apparatus according to the preferred embodiment arranged for operation.

As can be seen from FIGS. 1 and 2, focus adjustment and position adjustment of the cartridge head with respect to the microscope camera is provided by the solid assembly 108. In order to accurately secure the microscope to the assembly 108, a clamp mechanism 154 is provided on assembly 108 at the end of which a fork 156 clamps a lower abutment plate of the microscope 105 onto the receiving socket mounting 151 of assembly 108. The microscope 105 in the preferred embodiment has magnification adjustment capability, also referred to a zoom capability. In the microscope 105, the zoom capability is provided by rotating a bottom sleeve (not shown) using control lever 152. The control lever 152 may also be locked in one or more fixed magnification positions or moved to any magnification position by moving it from left to right. In the preferred embodiment, the camera 104 is a blank model CCD camera. The microscope 105 is a blank model microscope.

Figure 3:
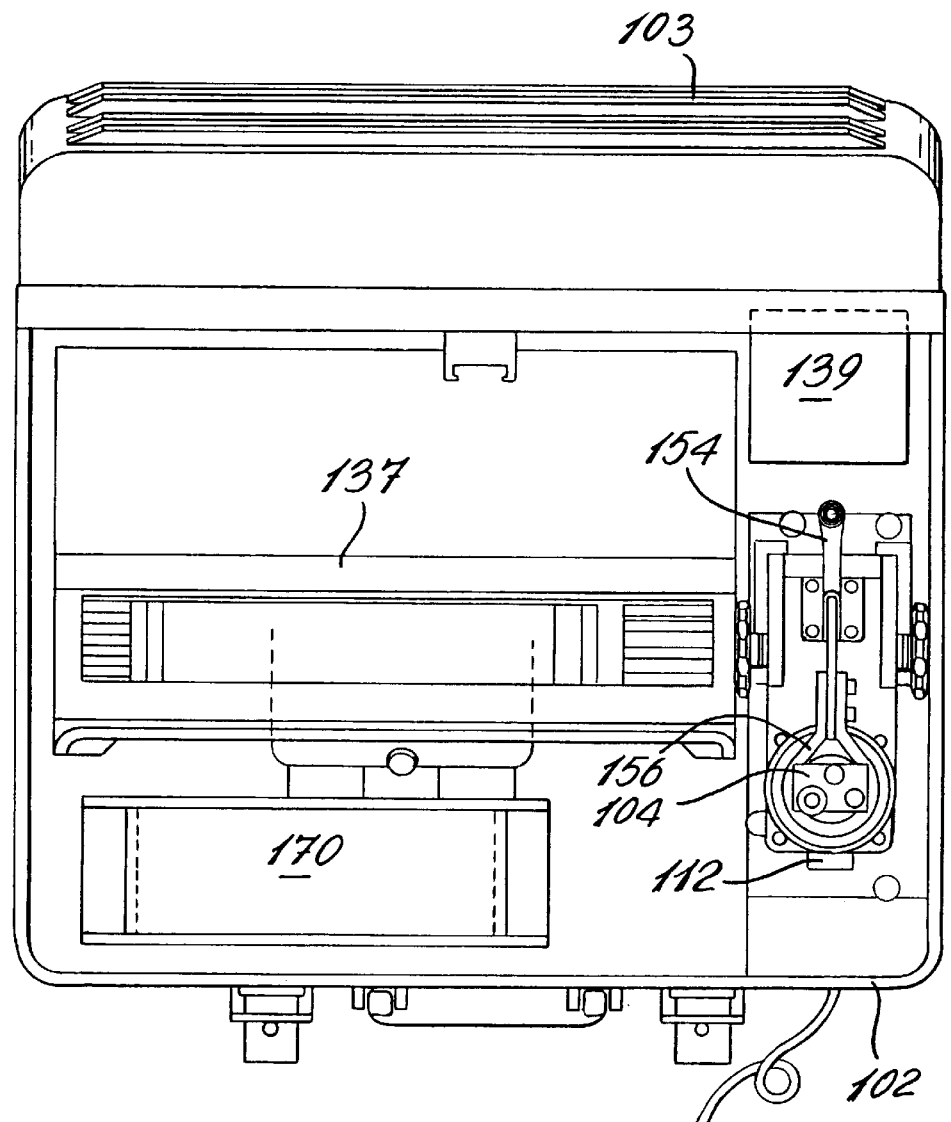
FIG. 3 is plan view of the apparatus according to the preferred embodiment arranged for transport.
Figure 3:
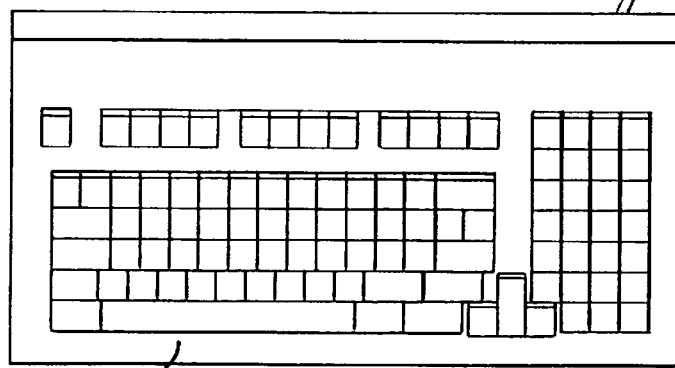
Figure 4:
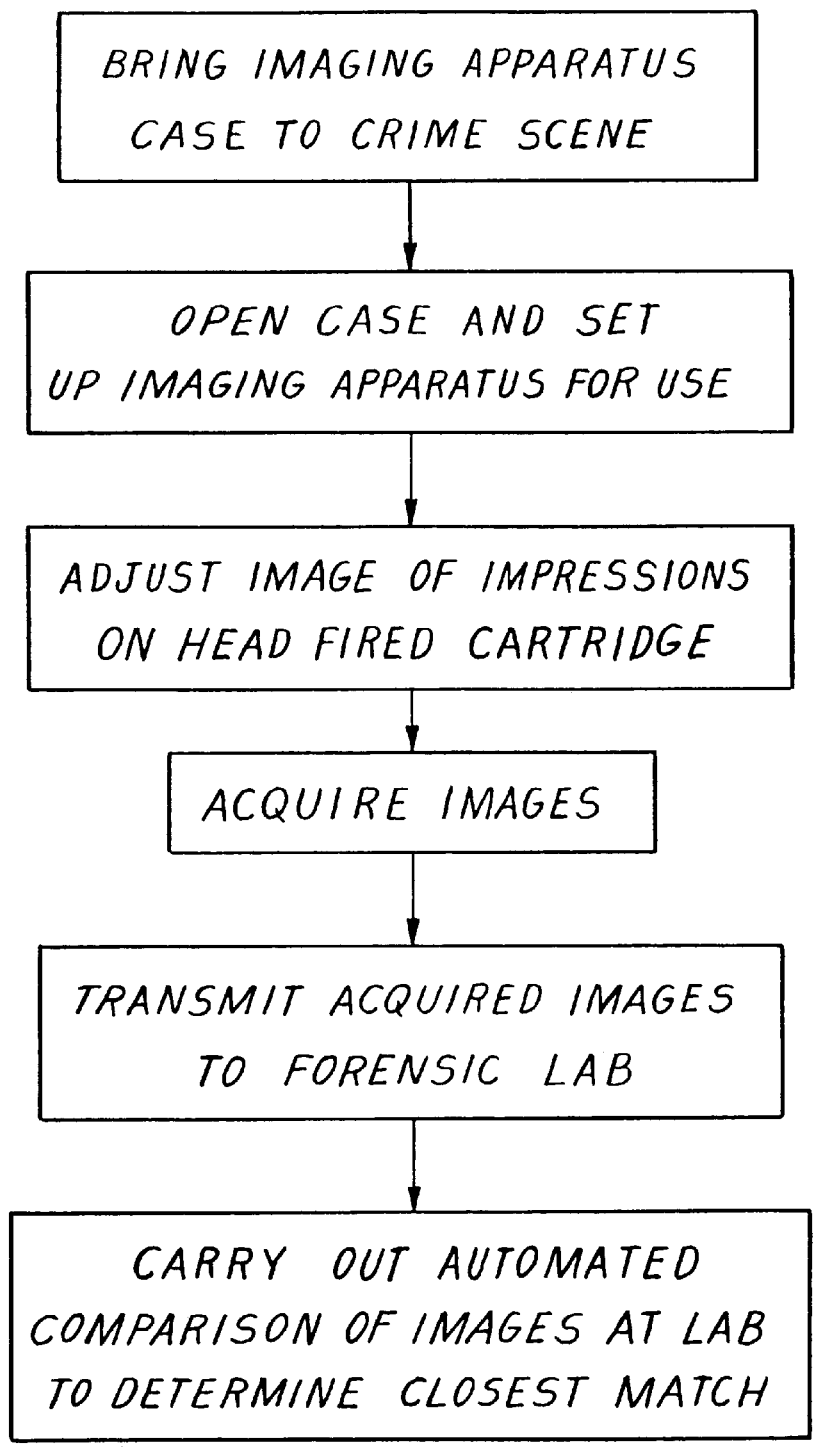
FIG. 4 is a flow diagram of the method according to the preferred embodiment.

Once the microscope 105 is clamped into the receiving ring 151, the optical system is securely aligned. In the preferred embodiment, the images generated by digital camera 104 are relayed to an on-board computer 137 mounted into the bottom 102 of the carrying case. As shown in FIG. 1, the computer 137 is pivotally mounted into the case and provided with a support bracket 175 so that the computer 137 can be rotated to face upward and forward while supported by bracket 175 when in use and then be returned to a lowered position during transport. The images of the cartridge heads taken using the camera system can be viewed on screen 138 and a keyboard 172 (shown in FIG. 3) can be used for data input and control of image recordal.

A base of assembly 108 is solidly mounted to a top surface 150 provided in the bottom part 102 of the crying case by four locking screws. The locking screws can be released and the assembly 108 can be placed with its rear portion in a cradle 170 during storage and transport. An upper part of assembly 108 is received by a hollow in the foam in the lid 103, as is shown at 180. The detached microscope 105 and connected camera 104 assembly is stored during transport on top of plate 150 and is secured on top of plate 150 in a safe and shockproof manner by placing a protective cushion underneath it and by providing a hollow made of foam in the lid 103 of the carrying case. Such a hollow is shown at 182.

To place the apparatus according to the preferred embodiment into operation, a police officer at the crime scene arrives with the carrying case and places the bottom part 102 on a stable surface and opens lid 103. The assembly 108 is lifted from its cradle 170 and the microscope 105 and camera 104 are removed from their secured position within the carrying case and inserted into the assembly 108. The microscope 105 is clamped into the receiving ring 151 and the base of the assembly 108 is screwed onto the top cover plate 150. The computer 137 is lifted and rotated upwards and towards the rear while the support 175 is engaged into a catch in the bottom of case 102. The computer 137 is turned on and a power supply 139 for powering the ring lamp projector 106 is turned on. The apparatus according to the preferred embodiment is then ready for field use. Images of spent cartridge casing casings obtained with the device can be acquired. Image adjustment and lighting adjustment may be carried out by the officer in the field before storing the desired image. Once an image is recorded in the computer 137, it may be written onto diskette for physical delivery to an analysis station, or the data storage in computer 137 may be uploaded by telecommunication means either by wireless or by land lines, e.g. by modem and telephone lines, or using a LAN connection between computer 137 and the analysis computer.

Figure 5:
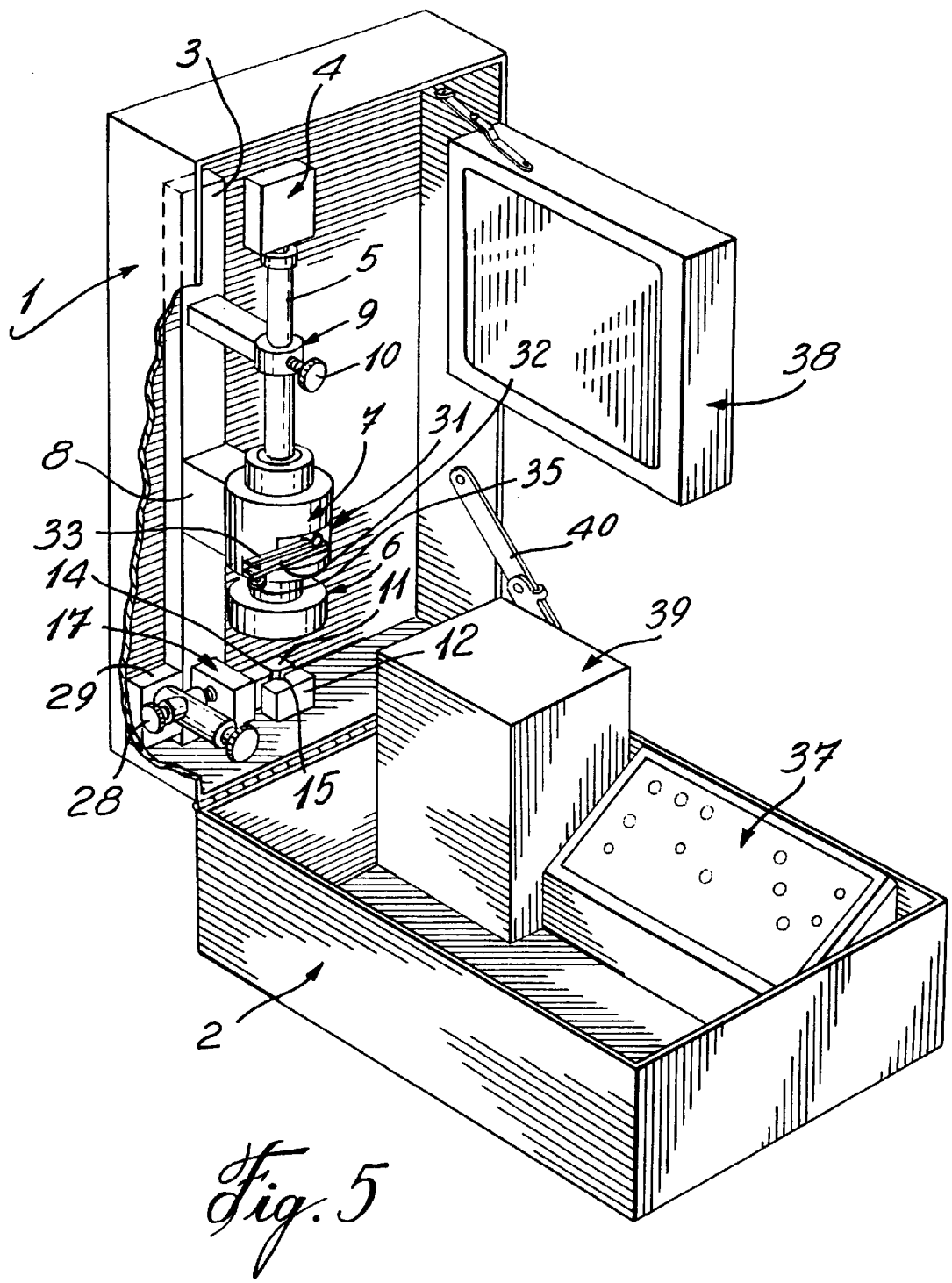
FIG. 5 is a perspective view of the apparatus according to the second embodiment in which the portable case is open.

As shown in FIG. 5, the second embodiment includes a carrying case with a lid 1 and a bottom 2. A metal holding strip 3 is fixed rigidly to the lid 1 and is used to support the mechanical parts needed for image acquisition. These are the camera 4, mounted on top of a zoom microscope 5, an assembly for holding and adjusting the position of the cartridge (11, 12), and a ring-light illuminator 6 at the bottom of the microscope.

The microscope body is guided by a cylindrical tube 7 which is attached to the strip 3 by a bracket 8. There is also a stabilizing ring 9 attached to strip 3 which permits the microscope body to slide up and down while preventing its rotation A thumb screw 10 can lock the microscope to prevent movement during transport in any desired position.

Located at the bottom of strip 3 is the assembly for holding and adjusting the position of the cartridge. This consists of a spring-loaded clamp having a fixed member 11 with a V-groove 14 cut in a vertical direction, a movable member 12 also provided with a V-groove 15 opposite to the groove 14. There are sliding pins 13 attached to member 12. The pins 13 are spring-loaded in a way that a clamping force is applied between members 11 and 12. The assembly ensures that the movable member 12 performs a parallel motion when it is made to clamp a cartridge 16 within the grooves 14 and 15. By pulling out member 12, a cartridge may be removed and by releasing member 11 after inserting a cartridge, a cartridge may be held in place. The cartridge is held in alignment as a result of the V-grooves at least in a sideways direction. Further adjustments in the sideways direction and also in an inwardly and outwardly direction is made possible by an X-Y adjustment system as will be described in greater detail hereinbelow.

Figure 8:
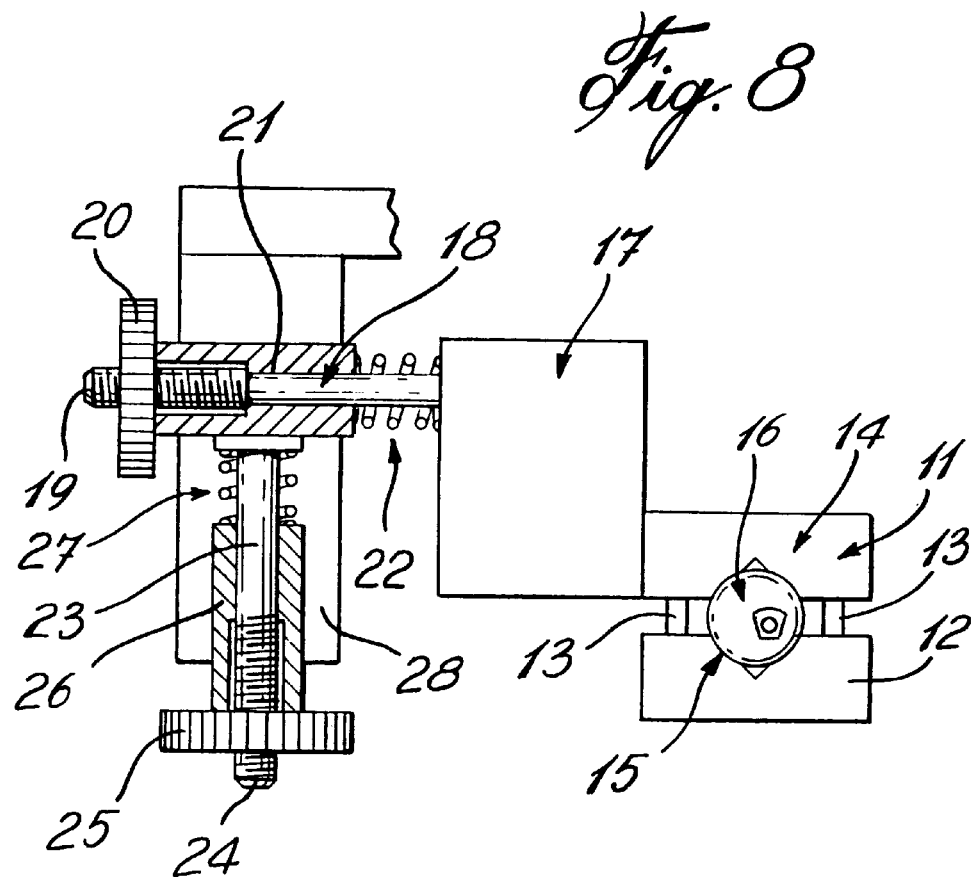
FIG. 8 is a top view of the cartridge mounting showing the X-Y alignment adjustment mechanism.

Member 11 of the clamping mechanism is attached to a block 17 which in turn has a guide pin 18 attached to it (see FIG. 8). The pin 18 has a threaded portion 19 at one end and a knurl nut 20. The guide pin 18 has a keyway and a key that permits the pin to slide longitudinally without rotation in a sleeve 21. A compression, spring 22 ensures that by turning the nut 20, the relative position between the block 17 and the sleeve 21 can be adjusted.

The sleeve 21 is rigidly attached to a guide pin 23 having a threaded end 24 and a nut 35. As with sleeve 21, a sleeve 26 is provided which guides pin 23 by means of a key without rotation. A spring 27 ensures that by turning the nut 25, that the relative position of the sleeves 21 and 26 can be adjusted.

Figure 6:
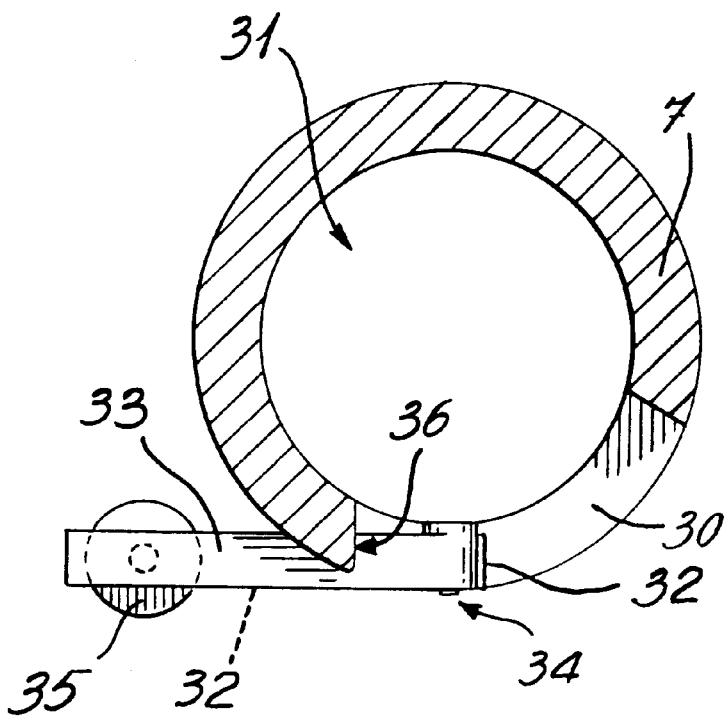
FIG. 6 is a detailed cross-section of the magnification/zoom adjustment lever.
Figure 7:
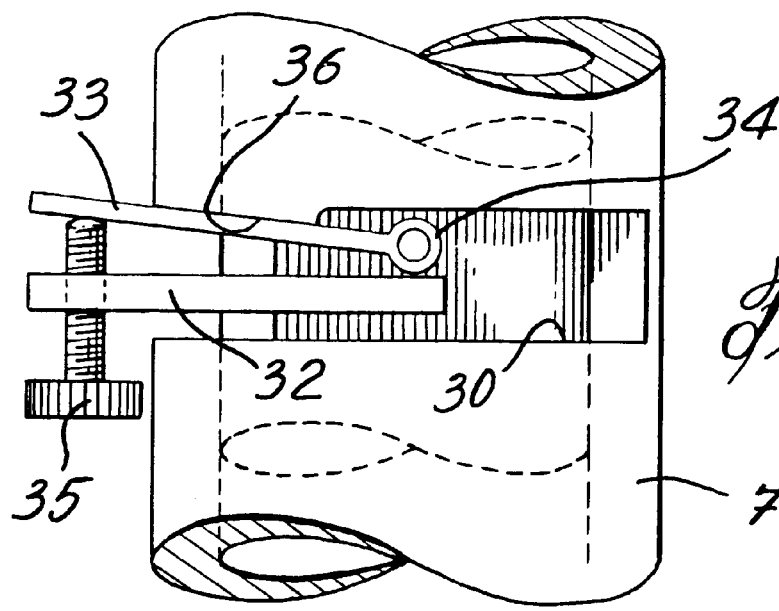
FIG. 7 is a detailed partial side view of the magnification/zoom adjustment lever according to the second embodiment.

Sleeve 26 is rigidly attached to a bracket 28 which in turn is attached to the metal strip 3 at its extension 29 at the bottom. By adjusting nuts 20 and 25, the position of the cartridge 16, as illustrated in FIG. 8, can be moved in two perpendicular directions (X-Y directions). This ensures that the correct location of the cartridge will be used for image acquisition. The microscope 5 is equipped with a zoom lens at the bottom. The adjustment of the zoom lens is achieved by turning the barrel located on the outside of the microscope (not shown). As shown in FIGS. 6 and 7, the cylindrical guide 7 has as its purpose to guide the microscope in the up and down direction and is provided with a cut-out 30 on its side. Cut-outs 30 provide access to the barrel 31 of the zoom lens. A bar 32 is rigidly attached to the barrel 31 and in a tangential direction to it. A second bar 33 is located above bar 32. Bar 33 is pivoted about a pin 34 which is rigidly attached to the zoom barrel 31. Using a screw 35, located in a threaded hole in bar 32, it is possible to create a V-shape between the bars 32 and 33 of an adjustable angular separation. When the microscope 5 is free to slide horizontally by loosening the thumb screw 10, the weight of the microscope will ensure that bar 33 is in contact with screw 35 since there will be a physical contact with bar 33 and the edge of the slot 30 at a point 36.

Figure 9:
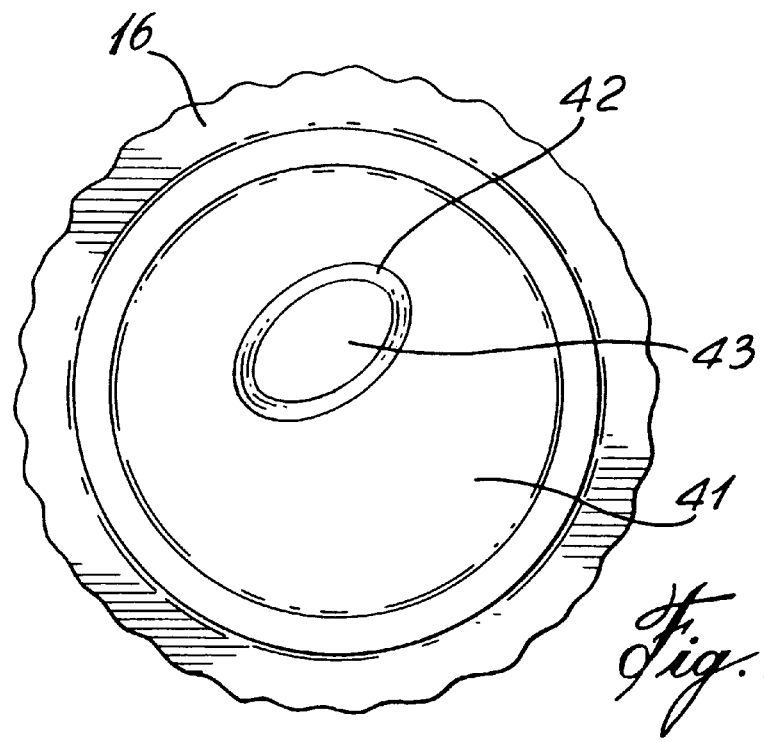
FIG. 9 is a schematic illustration of a primer from a spent cartridge casing.

As can be appreciated, by rotating the zoom bar 31 relative to the microscope 5 and the fixed sleeve 7, the zoom will be adjusted and simultaneously so will the vertical position of the microscope (thus adjusting the focus). The screw 35 can be adjusted so as to produce the right amount of vertical movement of the microscope and, the required change of the magnification at the same time. As shown in FIG. 9, the cartridge 16 has a primer surface 41 on which a firing pin impression 42 is made. The markings on surface 41 are engaged in one position and the markings on surface 43 are imaged in the other position. When the zoom or magnification is changed, the image changes from an image of substantially only surface 41 to one of substantially only 43.

The bottom of the carrying case houses a portable computer 37 with its monitor 38 attached to the lid 1 of the case so that the monitor can pivot so as to be placed in a convenient orientation. There is also a space 39 for the power supply of the equipment. A brace 40 ensures that the lid 1 is vertical and stable when opened.

As can be appreciated, the simultaneous magnification and focus adjustment means for adjusting a magnification of the microscope and a focus of the microscope between two settings are illustrated as a lever which adjusts the focus by vertically moving the microscope a fixed distance as the magnification or zoom is adjusted between two appropriate settings. It is, of course, possible to provide different mechanical arrangements which will provide the same easy-to-use two-in-one simultaneous adjustment. For example, the lever arm 32 and 33 could be made positionable between a first position and a second position in which positions the arm is received within a notch so that any vibration or small movement cannot upset the fixed position. The exact position of the notches could be made adjustable in order to set the exact magnification for each of the two positions as well as the exact focus for the two positions, thereby eliminating the need for the adjustment screw 35 and lever arm 33. Of course, such a system can require that the lever arm be lifted out of the notch before being rotated across to the other notch.

Preferably, the screen 38 provides a sufficiently good quality image that the police officer in the field can see that an image of the breech face impression on the primer surface or the firing pin impression surface in the primer surface is being viewed and recorded by the camera 4. It is also possible for the image recording computer 37 to carry out a superficial analysis of the image darkness and contrast in order to carry out an automatic intensity control to adjust an illumination level of the light source 6. The images collected may simply be stored on diskette for transferring to a ballistic analysis computer or the data may be transferred to the analysis computer via modem, either over land lines or by wireless communication, such as a cellular telephone.

We claim:

1. A portable spent cartridge casing examination imaging apparatus comprising:
   a spent cartridge casing mounting device for holding the cartridge substantially aligned with a longitudinal axis;
   a cartridge microscope having an optical axis;
   a light source for projecting light onto the cartridge head;
   a camera for obtaining an image through said microscope;
   a carrying case;
   means for securing said mounting device, said microscope, said light source and said camera inside said case for transport; and
   connecting means for solidly assembling said mounting device, said microscope, said light source and said camera together with said longitudinal axis parallel to said optical axis.

2. The apparatus as claimed in claim 1, wherein said connecting means comprise means for receiving the microscope provided on said cartridge mounting device, said mounting device including focus adjustment means.

3. The apparatus as claimed in claim 2, wherein said camera comprises a digital camera connected to an image acquisition computer contained within the case.

4. A spent cartridge casing examination imaging apparatus comprising:
   a spent cartridge casing mounting device for holding said cartridge casing substantially aligned with a longitudinal axis, said cartridge casing having a primer surface substantially perpendicular to said axis;
   a cartridge microscope having an adjustable magnification and an optical axis and mounted with said optical axis substantially parallel to said longitudinal axis;
   a light source mounted to project light onto said primer surface for illuminating a breech face impression and a firing pin impression on said primer surface; and
   simultaneous magnification and focus adjustment means for adjusting a magnification of said microscope and a focus of said microscope between two settings to image a breech face impression on said primer surface and a firing pin impression surface in said primer surface,
   whereby full images of said breech face and said firing pin impressions can be obtained with good focus using a single adjustment.

5. The apparatus as claimed in claim 4, further comprising means for automatically analyzing said image and adjusting an intensity of said light source to improve a quality of said image.

6. The apparatus as claimed in claim 5, further comprising means for automatically storing said image.

7. The apparatus as claimed in claim 4, further comprising a carrying case having a base, a lid, and means for holding said lid open;
   a camera for recording an image from said microscope;
   holding means for solidly interconnecting said mounting device, said microscope, said camera and said light source; and
   means for connecting said holding means to said lid such that said mounting device, said microscope, said camera and said light source are substantially vertically disposed when said lid is open, said mounting device, said microscope, said camera and said light source being at least partially received by said base of said case when said lid is closed,
   whereby said apparatus can be used in a conventional manner when said lid is open and can be safely transported when said lid is closed.

8. The apparatus as claimed in claim 4, wherein said light source is a ring lamp.

9. The apparatus as claimed in claim 4, wherein said mounting device comprises a pair of opposed vertical plates resiliently biased toward one another, one of said plates being provided with a V-shaped groove having a vertical lengthwise extent parallel to said longitudinal axis, whereby said cartridge is received by said groove and held between said plates.

10. A portable spent cartridge casing examination imaging apparatus comprising:
    a carrying case having a base, a lid and means for holding said lid open;
    a spent cartridge casing mounting device for holding said casing substantially aligned with a longitudinal axis, a head of said cartridge casing being substantially perpendicular to said axis;
    a cartridge microscope having an adjustable magnification and an optical axis and mounted with said optical axis substantially parallel to said longitudinal axis;
    a camera for recording an image from said microscope;
    a light source mounted to project light onto said head of said cartridge casing;
    holding means for solidly interconnecting said mounting device, said microscope, said camera and light source; and
    means for connecting said holding means to said lid such that said mounting device, said microscope, said camera and said light source are substantially vertically disposed when said lid is open, said mounting device, said microscope, said camera and said light source being at least partially received by said base of said case when said lid is closed,
    whereby said apparatus can be used in a conventional manner when said lid is open and can be safely transported when said lid is closed.

11. The apparatus as claimed in claim 4, wherein said microscope has a magnification adjustable between a first setting suitable to view a breech face impression on a primer surface of said head and a second setting suitable to view a firing pin impression in said primer surface.

12. The apparatus as claimed in claim 11, further comprising means for automatically adjusting a focus of said microscope to place into focus said firing pin impression and said breech face impression.

13. The apparatus as claimed in claim 12, wherein said means for automatically adjusting said focus comprise simultaneous magnification and focus adjustment means for adjusting a magnification of said microscope and a focus of said microscope between two settings to image a breech face impression on said primer surface and a firing pin impression surface in said primer surface.

14. The apparatus as claimed in claim 10, wherein said light source is a ring lamp.

15. The apparatus as claimed in claim 10, wherein said mounting device comprises a pair of opposed vertical plates resiliently biased toward one another, one of said plates being provided with a V-shaped groove having a vertical lengthwise extent parallel to said longitudinal axis, whereby said cartridge is received by said groove and held between said plates.

16. The apparatus as claimed in claim 10, wherein said carrying case further contains an image memory means for storing spent cartridge casing images and means for transferring image data from said memory means in said portable apparatus to a forensic ballistics analysis computer.

17. A method of spent cartridge casing forensic analysis comprising the steps of:

provide a mobile spent cartridge casing imaging apparatus at a crime scene;

imaging of a spent cartridge casing in the field using the mobile imaging apparatus to obtain a spent cartridge casing image;

sending the obtained image to a forensic spent cartridge casing image comparison laboratory; and carrying out at said laboratory an automated comparison of the obtained image with other images to determine closest matches between the obtained image and the other images.

* * * * *